United States Patent [19]
Birdsong et al.

[11] Patent Number: 5,131,277
[45] Date of Patent: Jul. 21, 1992

[54] REVERSE OSMOSIS SYSTEM

[75] Inventors: Thomas E. Birdsong, Loveland; Steve O. Mork; Steven L. Peace, both of Fort Collins, all of Colo.

[73] Assignee: Teledyne Industries, Inc.

[21] Appl. No.: 747,611

[22] Filed: Aug. 20, 1991

Related U.S. Application Data

[62] Division of Ser. No. 685,680, Apr. 16, 1991, which is a division of Ser. No. 466,077, Jan. 16, 1990, Pat. No. 5,096,574.

[51] Int. Cl.$^5$ .............................. G01F 1/22; G01F 1/40
[52] U.S. Cl. ........................... 73/861.05; 73/861.54; 210/87; 210/97
[58] Field of Search ......... 73/861.54, 861.05, DIG. 5; 210/541, 542, 87, 97; 324/510, 511, 71.1

[56] References Cited

U.S. PATENT DOCUMENTS 4,462,262  7/1984  Kahnke ........................... 73/861.05
4,787,253  11/1988  de Fasselle et al. .............. 73/861.54

Primary Examiner—Frank Sever
Attorney, Agent, or Firm—Hugh H. Drake

[57] ABSTRACT

A reverse osmosis system includes a sediment filter which cleans feed water from a source and from which that feed water is fed to a reverse osmosis membrane filter. Permeate from the latter is fed to a bladder within a storage tank. Concentrate from the membrane filter is fed to and used within the storage tank as squeeze water for the bladder. When a faucet that delivers permeate to the user is open, squeeze water is used to cause permeate to flow out of the storage tank through an impurity filter to supply the faucet. A valve unit is included to control the amount of squeeze water fed to the storage tank and to regulate permeate flow so that the water outletted from the faucet remains at a constant pressure and provides relief as against overpressure in the system. A proportioning valve within the valve unit serves to maintain at all times a constant ratio of concentrate to permeate flow through the membrane filter for adequate cleansing of the membrane. Also included are input-side and output-side flow monitors which provide signals to a processor that serves to indicate the status of filter conditions. There also is an advantageous faucet assembly for controlling the delivery of permeate to the user with flexibility and convenience.

4 Claims, 9 Drawing Sheets

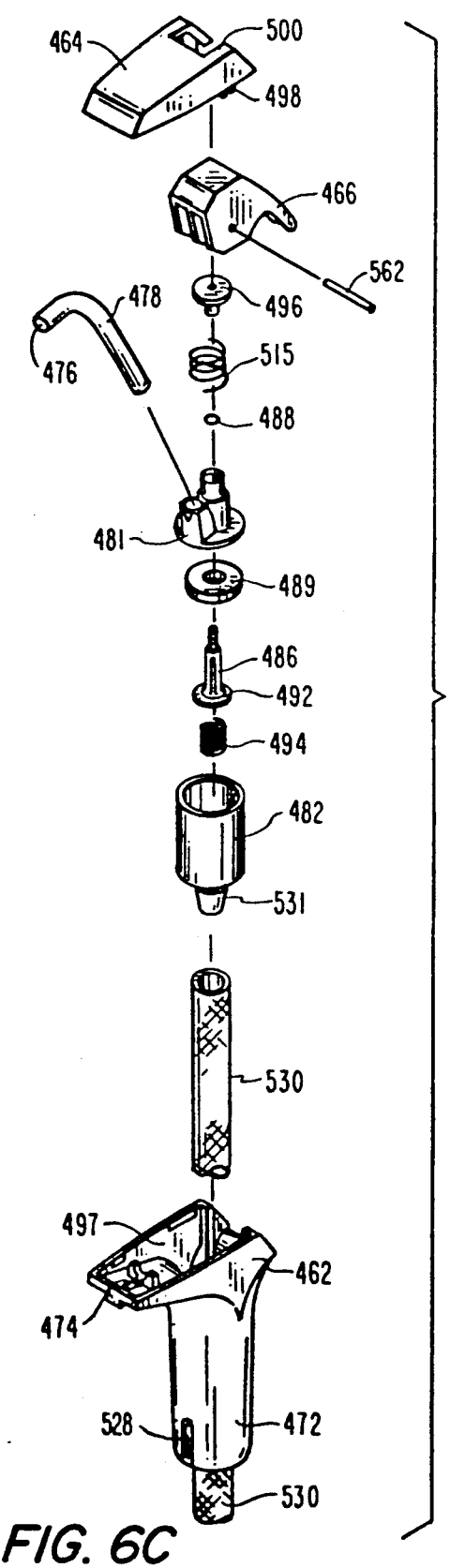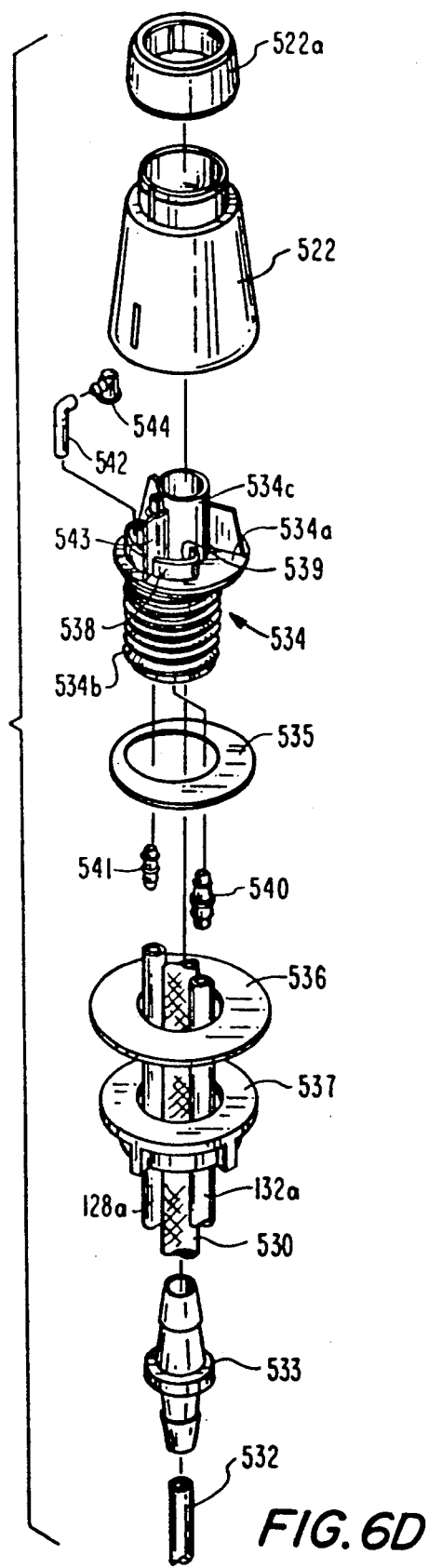
FIG. 6C
FIG. 6D

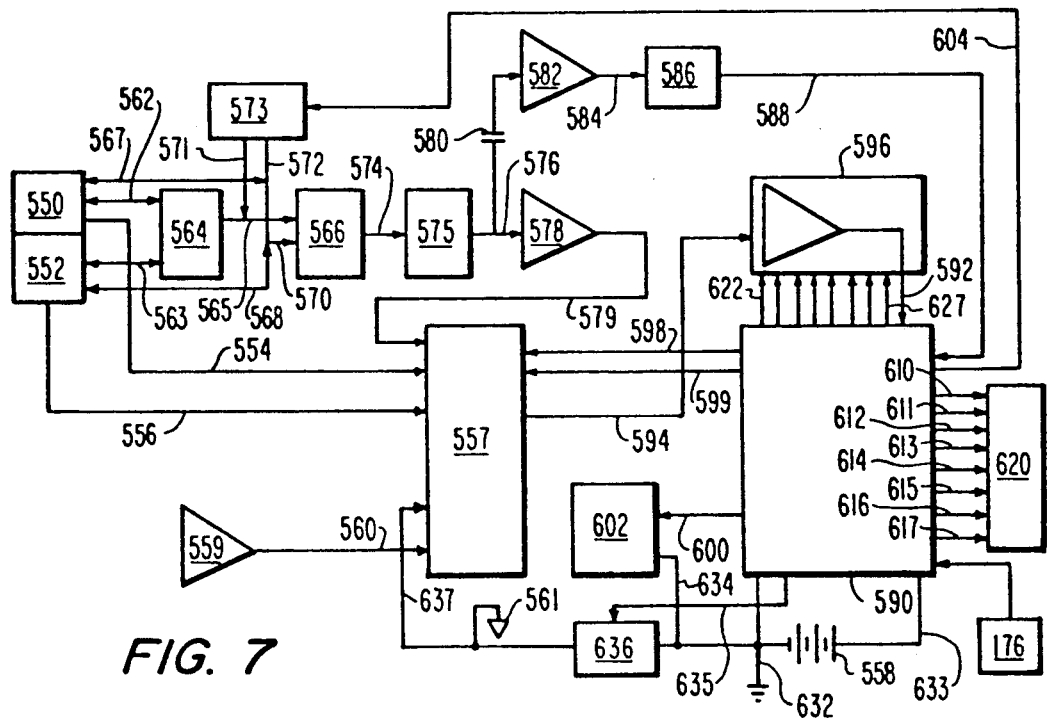
FIG. 7
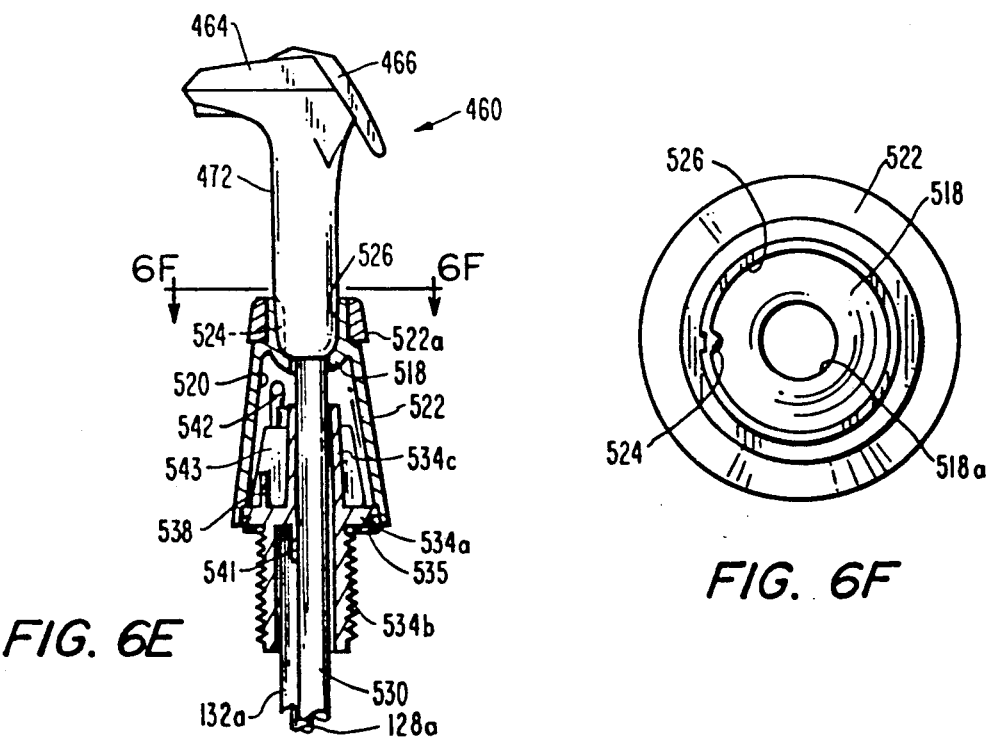
FIG. 6E
FIG. 6F ns systems. More particularly, the invention pertains to im-
REVERSE OSMOSIS SYSTEM

RELATED APPLICATION

The present application is a division of co-pending divisional application Ser. No. 07/685,680 filed Apr. 16, 1991, pending which was in turn a division of then co-pending parent application 07/466,077 filed Jan. 16, 1990 now U.S. Pat. No. 5,096,574 and all assigned to the same assignee.

The present invention relates to reverse osmosis systems. More particularly, the invention pertains to improvements in and for such systems by including a filter monitor, a controlling valving system, an electronic processor and a faucet assembly.

Two major additions to water systems, particularly for residential and other smaller water consumption applications, have been an activated carbon bed to remove organic materials and sediment filters to remove undissolved solids. A third category which has gained interest uses reverse osmosis through a thin membrane which filters the dissolved solids from the water. Those solids which have been removed are washed from the membrane and passed to a drain. This latter filtering process is comparatively very slow, typically generating between five and twenty gallons per day. Accordingly, it becomes necessary to incorporate a storage device for consumer convenience and utility. Reverse osmosis systems typically also include carbon-bed and sediment filters to best remove all of sediment, organic materials and inorganic materials.

One or more of three different problems usually arise with presently available reverse osmosis units. They involve faucet delivery rate, permeate generation and water conservation. Many devices commonly used incorporate an elastomeric bladder disposed within a storage tank that separates the filtered water from air which has been pressurized to about five pounds per square inch. That compressed air causes delivery of the treated water to a faucet for consumptive use. However, as the storage tank fills with water the air is compressed and this in turn increases the tank pressure. Accordingly, when the consumer dispenses the water after starting with a full tank, the flow rate of the dispensed water is higher than when delivering water at a time when the storage tank is nearly empty. In addition, that increased pressure on the tank usually places a back pressure on the reverse osmosis membrane, resulting in decreased performance of the membrane. Finally, once the storage tank is full the system may continue to operate in which case water is unnecessarily wasted to the drain.

Efforts have been made to solve two of the problems mentioned above by means of the incorporation of a hydraulically operated valve that controls operation of the system. While that approach has proven feasible, existing configurations operate only over a very limited pressure range. Of background interest in the art with respect to reverse osmosis systems are U.S. Pat. Nos. 4,077,883-Bray, 3,746,640-Bray, 3,831,757-Gosset et al, 3,887,463-Bray, 4,176,063-Tyler and 4,391,712-Tyler et al.

It is one object of the present invention to provide a new and improved hydraulically-operated valve which provides a constant delivery of consumer water usage.

Another object of the present invention is to provide a new and improved arrangement which conserves water by eliminating diversion to a drain when the storage tank is full.

A further object of the present invention is to provide an hydraulic valving system capable of operating over a wide range of pressure.

Especially in residential applications, one installation of a reverse osmosis system is beneath the kitchen sink. The cleansed and purified water can be dispensed by feeding it to a fixed third faucet, which often is in place of a vegetable spray arrangement, with usage primarily limited to dispensing into the sink basin area. That often is inconvenient in use for several different reasons.

Still another object of the present invention is to provide a new and improved delivery faucet or outlet valve for use in a reverse osmosis system and which enables either momentary or continuous water delivery either in the sink or over the countertop.

Devices are known for enabling the user to determine the removal rate of a reverse osmosis membrane by first taking a sample of the raw water and then manually comparing it to a sample of the permeate water. Normally, the level of total dissolved solids (TDS) is determined by measuring electrical conductance at a specific temperature, e.g. 72° F. These devices often have been either held by hand or connected to the output of the reverse osmosis system to allow the user to determine the conductance. In-line conductance monitors usually require that a series of switches be set up according to the conductance of input or feed water. That step typically requires the use of a more sophisticated TDS measuring device to determine the percentage of dissolved solids as typically measured by the conductance in micromhos. After the switches are set up, the device is then installed in the permeate water line to the outlet of the system.

That approach is lacking in four major areas. First, a service organization usually has to determine the TDS or conductance and program the in-line monitor for the consumer. Secondly, this type of device can accumulate a build-up of minerals on its probes projected into the water flow with that accumulation leading to the result of inaccurate readings. The third problem occurs particularly when the input water varies in its conductance by reason of spring rains or other runoff conditions. That is, such an approach cannot offset its reading because it has no way of determining the conductance of the feedwater. The fourth problem occurs when temperature differences exist between the input and output water conditions.

One objective of the present invention is to provide a way of determining the differential between input and output TDS while keeping the measurement probes clean during operation and which allows the user to install and use the system without needing an extra TDS measuring device.

Another objective is to provide a system which corrects for conductance variations with the temperature changes as a result of which TDS is measured directly.

It is also known to use a monitoring system which automatically compares feedwater and permeate product water. This employs probes on the inlet side and at the outlet side and is advantageous over the use of only a single probe monitor which may need recalibration every time the feedwater temperature and the level of total dissolved solids changes. Such a monitor compares conductivity of the feed and the permeate at the same time and includes circuitry for calculating the rejection ratio. However, known prior art monitors have suffered from deterioration in performance by reason of eventual probe malfunction.

A related object of the present invention is to provide a flow monitor in which conductivity probes are maintained in a condition which enables them to continue functioning properly.

An ancillary feature of the present invention is the provision of programmed sensing and calculation and the giving to the user of an indication of the condition of one or more components such as the status of all filters with respect to anticipated ultimate component life and operational status.

Accordingly, a reverse osmosis system includes a feed water inlet and a permeate outlet together with a squeeze water drain and an outlet valve. A reverse osmosis assembly includes a housing within which is disposed a reverse osmosis membrane and which has a feed water entrance, a permeate exit and a concentrate exit. A storage tank has a shell within which a bladder is disposed and which has a first port for communicating squeeze water between the outside of the housing and the space within the housing on the outside of the bladder. A second port communicates permeate between the housing outside and the space within the bladder. An input valve controls water flow from the feed water inlet to the feed water entrance in response to the pressure differential between the permeate and the squeeze water in the tank. A first conduit arrangement defines a permeate flow path from the permeate exit to the second port of the tank, while a second conduit arrangement defines a concentrate path from the concentrate exit to the first port of the tank. A squeeze water valve is disposed in the concentrate path and operates to control the flow of the concentrate between the concentrate exit and that first port. A proportioning valve is coupled between the concentrate path upstream from the squeeze water valve and the drain, and a relief valve is coupled between the drain and a concentrate path downstream from the squeeze water valve. Finally, a regulator is coupled between the permeate path and the permeate outlet and is responsive to pressure differential between the permeate outlet and the permeate path to control permeate flow to the permeate outlet.

In another aspect of the present invention, there is a flow meter which has a hollow housing with an interior wall formation that defines a circular raceway. An inlet channel leads from the exterior of the housing thereinto and opens tangentially into that raceway. An outlet channel leads from the raceway back to the exterior of the housing. A pair of mutually-spaced electrically conductive probes lead from the exterior of the housing insulatingly therethrough to exposure within the raceway. Finally, there is a ball sized to move freely around the raceway when propelled by liquid flowing from the inlet channel to the outlet channel with the ball being of a material sufficiently abrasive to remove deposited matter from the electrodes. The ball has an electrical characteristic which effects an electrical signal when moving thereacross.

Other features of interest are the coaction between components whereby the regulator responds to increased outlet pressure following closure of the outlet valve to close the squeeze valve, the provision in the overall system of a sediment filter and an impurity filter, the inclusion of check valves at critical points to direct operation of the system, the manner of electronic calculation and indication of component life status and certain unique valving features. A further feature of interest resides in a movable faucet assembly variously operable to produce either momentary or continuous flow and desirably also including an air-gap unit for the waste drain.

The features of the present invention which are believed to be patentable are set forth with particularity in the appended claims. The organization and manner of operation of one specific embodiment of the invention, together with further objects and advantages thereof, may best be understood by reference to the following description taken in connection with the accompanying drawings, in the several figures of which like reference numerals identify like elements, and in which:

FIG. 6C is an exploded isometric view of a portion of the faucet shown in FIG. 6A;

FIG. 6D is an exploded isometric view of a remaining portion of the faucet shown in FIG. 6A together with additional parts of a faucet assembly;

FIG. 6E is a side elevational view of the faucet of FIG. 6A as associated with an additional mounting and air-gap assembly of FIG. 6D depicted in longitudinal vertical cross-section;

FIG. 6F is a top plan view taken along line 6f—6f in FIG. 6E and with the faucet removed;

FIG. 7 is a flow diagram of a processor used in connection with the filter system of FIGS. 1 and 2;

FIG. 8A is a partial schematic diagram of the processor to which FIG. 7 is directed.

Figure 1:
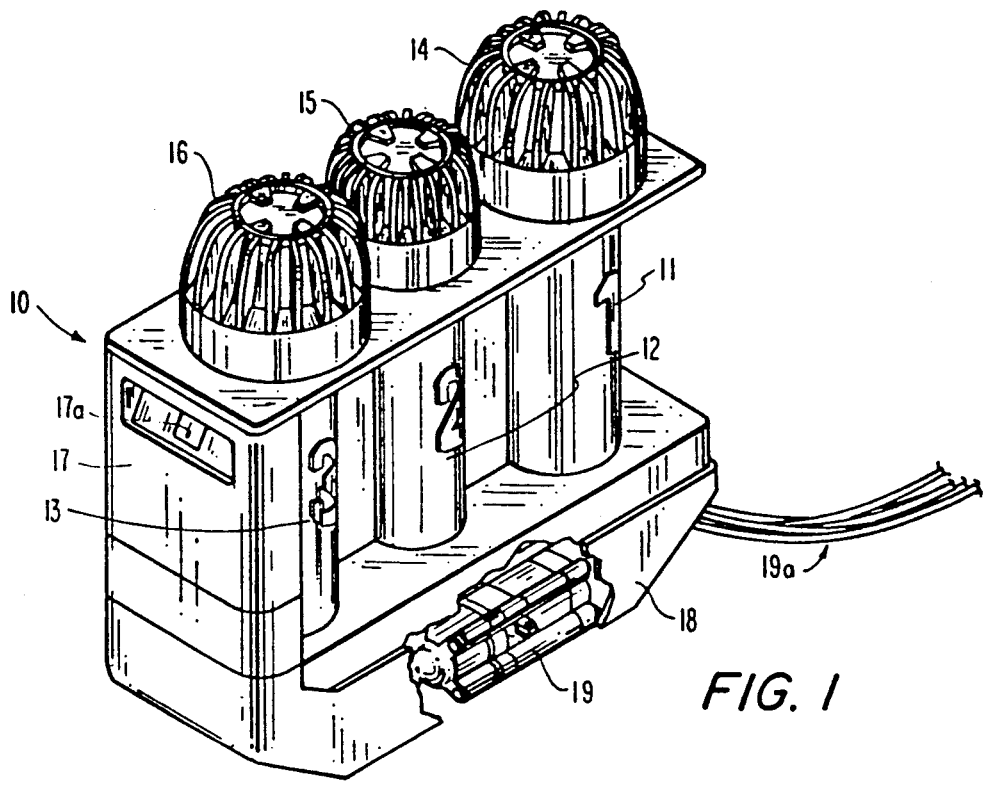
FIG. 1 is an isometric view of a filter assembly cabinet.

In the drawings which illustrate one specific embodiment of the present invention, FIG. 1 is an isometric view of a cabinet 10 in which are formed cavities 11, 12 and 13 which respectively receive cartridges housing an inorganic filter, a reverse osmosis filter and a sediment filter all of which will be described further hereinafter. Cavities 11, 12 and 13 are closed by respective caps 14, 15 and 16 each threaded upon an upper end of the corresponding cavity. Disposed at one end of assembly 10 adjacent to cavity 13 is a compartment 17 within which is housed a printed circuit board that carries the electronic components of a signal processing system and that also has a recessed window 17a behind which is located an indicator or display also carried by the printed circuit board all as will be discussed hereinafter.

Cabinet 10 has a base 18 in the hollow interior of which is mounted a module 19 as well as other components yet to be described. Leading outward from cabinet 10 are several conduits 19a the purpose of which also will be described hereinafter.

Figure 2:
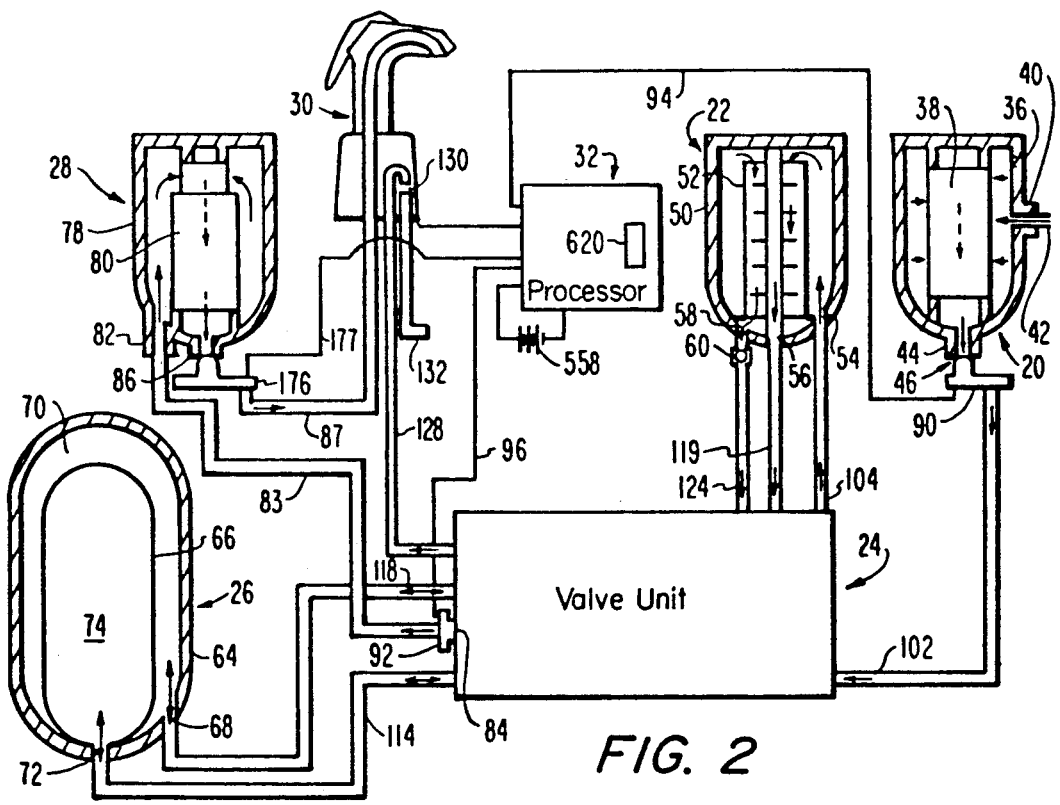
FIG. 2 is a flow diagram of the filter assembly of FIG. 1.

Along with a faucet assembly shown and described in more detail later, the overall specific embodiment constitutes a reverse osmosis system which is organized into a combination of a sediment filter 20, a reverse osmosis filter 22, a valve unit 24, a storage tank 26, an impurity filter 28, a permeate dispenser or faucet 30 and a signal processor 32 all as shown in FIG. 2. While the different components within valve unit 24 may each be a separate article hydraulically interconnected in the manner shown in FIG. 3, they preferably are all combined into module 19 of FIG. 1. This is advantageous both from the standpoint of manufacturing economy but also in terms of ease and time of installation.

Sediment filter 20 is conventional, including a container 36 in which is disposed a sediment filter media 38. An input coupling 40 receives the raw water from a source 42. An outlet coupling 44 delivers feed water from media 38 and that becomes a feed water inlet 46.

Sediment filter media 38 is in this case a wound polypropylene fiber as is known for use in filtering water derived from municipal water systems and wells. The media serves to remove dirt particles. While not shown in connection with the present embodiment, it may be advantageous particularly in larger systems to incorporate added valving and piping to permit backwashing of the sediment filter media to flush trapped sediment into a drain. On the other hand, when it is desired to employ the balance of the reverse osmosis system in an application wherein the raw water produced from the source is essentially free from sediment, sediment filter 20 might be eliminated. In that case, the raw water source is connected directly to feed water inlet 46.

Reverse osmosis filter or assembly 22 includes a housing 50 in which is disposed a reverse osmosis membrane 52. Housing 50 has a feed water entrance 54, a permeate exit 56 and a concentrate exit 58. As such, the operation of reverse osmosis filters is well known. Microscopic inorganic materials contained in the feed water tend to build up on the surface of membrane 52, while only cleansed water passes through the membrane for delivery from exit 56. A portion of this feed water constantly washes over the inlet-side surface of the membrane so as continually to remove the build up of the filtered particles and carries those particles out of exit 58 as what is conventionally called the concentrate. The membrane also is flushed when the faucet is actuated and when concentrate flows to serve as the squeeze water next to be discussed. A ball-type check valve 60 is located on the outlet side of exit 58 for the purpose of preventing the flow of concentrate back into filter 22.

Storage tank 26 has an outer shell 64 within which is disposed a resilient bladder 66. Shell 64 has a first port 68 which communicates that which is called squeeze water between the outside of shell 64 and the space 70 within shell 64 but on the outside of the wall of bladder 66. A second port 72 communicates permeate between the outside of shell 64 and a space 74 within the wall of bladder 66. In a manner well known as such in reverse osmosis systems, squeeze water in the form of concentrate received from exit 58 of filter 22 is employed to literally squeeze bladder 66 and thereby force out permeate in the bladder toward the delivery end of the overall system, in this case faucet 30.

In principle, the squeeze water path could be in communication with the inside of bladder 66 with the permeate path being in communication with the space within shell 64 but outside bladder 66. In that case, the squeeze water would be squeezing the stored permeate by expanding the bladder.

Impurity filter 28 has a canister 78 within which is a filter bed 80. Canister 78 includes an input coupling 82 connected to an outlet path conduit 83 for delivering permeate received by way of an outlet 84 of valve unit 24. Canister 78 also has an output coupling 86 carrying flow from filter media 80 to outlet valve 30 by way of a conduit 87. Filter media 80 is in this instance a known bed of activated carbon particles. That bed removes and treats organic materials. In most carbon filters for systems which supply water for human consumption, a special function is that of seeking to remove that which effects odor and bad taste. In other industrial applications, impurity filter 28 might use a media generally but significantly of different kind in order to effect the removal of some particular substances in the raw water that would be deleterious to the industrial process served. Analogously, when the system is going to be used for a purpose other than human consumption and when organic materials would be of no concern, or for use in an environment where the water source was of sufficient organic purity, impurity filter might be eliminated from the overall reverse osmosis system.

Disposed in the water path at output coupling 44 of sediment filter 20, at what may be viewed as the feed water inlet 46 of the remainder of the system, is a flow monitor 90. Similarly disposed in the permeate water path at permeate outlet 84 of valve unit 24 is a flow monitor 92 from which the flow path continues in conduit 83 to impurity filter 28. Flow monitors 90 and 92 will be described in more detail later. It will suffice for the present to mention that they serve to measure the temperature and conductivity of the liquid to develop signals which are delivered to processor 32 by means of respective cables 94 and 96. In a less-preferable alternative, monitor 92 is located between outlet 86 and faucet 30.

In the description which follows with respect to the interconnections among the different components even within valve unit 24, the word "conduit" is used generically to describe any form of liquid flow path. In actuality for connection purposes, that path may be provided by means of any of a pipe, hose, tube or rigid channelway in a molded part. To be addressed now are the details which in the specific embodiment are included within valve unit 24.

An inlet valve 100 controls water flow from feed water inlet 46 connected by a conduit 102 and leaving valve 100 by way of a conduit 104 to supply the feed water to entrance 54 of reverse osmosis filter 22. Inlet valve 100 includes a piston 106 having a large end 108 biased by a spring 110 toward an elastic diaphragm 112. The side of diaphragm 112 opposite enlarged end 108 is coupled by a conduit 113 into a permeate conduit 114 leading from port 72 of storage tank 26. The other side of enlarged piston end 108 is coupled by a conduit 116 into a conduit 118 which communicates squeeze water between valve unit 24 and port 68 of storage tank 26.

A conduit 119 is connected between permeate exit 56 of membrane filter 22 through a check valve 120 poled to pass flow on into a connection with permeate conduit 114. Conduits 119 and 114 complete a path from permeate exit 56 to permeate port 72. Opposite enlarged end 108 of piston 106 is a smaller end with a conically shaped nose 121 which projects a variable distance into a seat 122 of valve 100. Inlet valve 100 controls inletted water flow through membrane filter 22 in response to the pressure differential between the permeate and the squeeze water in storage tank 26 at any time.

Another conduit arrangement is composed of the series combination of a conduit 124, a squeeze water valve 126 and squeeze water conduit 118. That arrangement defines a concentrate path from concentrate exit 58 of membrane filter 22 to port 68 of storage tank 26. Squeeze water valve 126 is operable to control the flow of the concentrate between concentrate exit 58 and port 68. Connected into conduit 124 ahead of squeeze water piston 126 is a proportioning valve 127 coupled between the concentrate path upstream from valve 126 and a drain 128. Drain conduit 128 leads to an air gap 130 from which drain flow continues into an exhaust drain 132. Air gap 130 avoids adverse conditions which otherwise might occur from siphoning of what effectively is a drain sump back into the system.

One purpose of proportioning valve 127 is to maintain a fixed ratio of concentrate to permeate from membrane filter 22. In this case, the ratio selected is that of eight parts concentrate to one part permeate. That ratio may change in correspondence with the requirements of the particular membrane material selected for use. Another function is to ensure that water continues to wash across membrane 52 at any time that permeate is being generated. For that reason, the proportioning valve is always open to a degree. This ensures that the membrane surface is continually washed and thereby cleaned. The result is extended life of membrane 52.

A relief valve 134 is coupled from concentrate path 118 downstream from squeeze water valve 126 and feeds into drain 128. Valve 134 serves to relieve pressure from storage tank 26 when incoming permeate flow is filling bladder 66.

A regulator 140 includes a hollow piston 142 having an enlarged flange-like end 144 and disposed within a surrounding cylinder 146. A spring 148 inside cylinder 146 urges piston 142 away from adjacent squeeze water valve 126. A conduit 150 is coupled into the permeate path of conduit 114 and feeds permeate through a check valve 152 into a smaller hollow end 154 of piston 142. It will be observed that regulator 140 is coupled between the permeate path and, ultimately, the permeate outlet at valve 30.

Regulator 140 responds to the pressure differential between the permeate outlet flow path and the permeate in bladder 66 to control permeate flow to the permeate outlet. Smaller end 154 of piston 142 opposite enlarged piston end 144 presents a surface 156 which is exposed to the permeate pressure in conduit 150. A conduit 158 leads from the space within cylinder 146 between the two piston ends 144 and 154 into drain conduit 128.

Squeeze water valve 126 includes a piston 160 having one closed end 162 aligned with and adjacent to a hollow boss 164 which forms a part of smaller end 154 of piston 142. A spring 166 inserted into a well 168 formed into the other end 170 of piston 160 is compressed to urge piston 160 to a stopped position closest to piston 142. Piston end 170 is tapered to define a nose 171 that faces a seat 172.

When squeeze water valve 126 is open, concentrate flows through conduit 124 from exit 58 and is delivered into conduit 118 which leads to port 68. Upon an increase of permeate pressure in conduit 83, as when faucet 30 is partially closed, regulator piston 142 moves against spring 148 and toward piston 160 of squeeze water valve 126. As the space between pistons 142 and 160 is restricted, permeate flow through regulator 140 is reduced. Upon closing of faucet 30, piston 142 pushes on piston 160 and begins to close valve 126 to reduce squeeze water flow through conduit 118 to port 68. With faucet 30 fully shut off, both permeate flow through regulator 140 and concentrate flow through valve 126 become blocked.

A pressure responsive switch 176 is disposed at outlet 86 of impurity filter 28 and is coupled to conduit 87 which carries the permeate to faucet 30. When a minimum operation system pressure occurs as when faucet 30 is fully open, switch 176 closes to send a signal to processor 32 by way of a cable 177. An indication is thereby given when the output faucet is open. If desired, squeeze water pressure may be monitored in the alternative or in addition and an indication given to signal directly when bladder 66 is full. It will be observed that other such pressure detection points may be used.

Figure 5A:
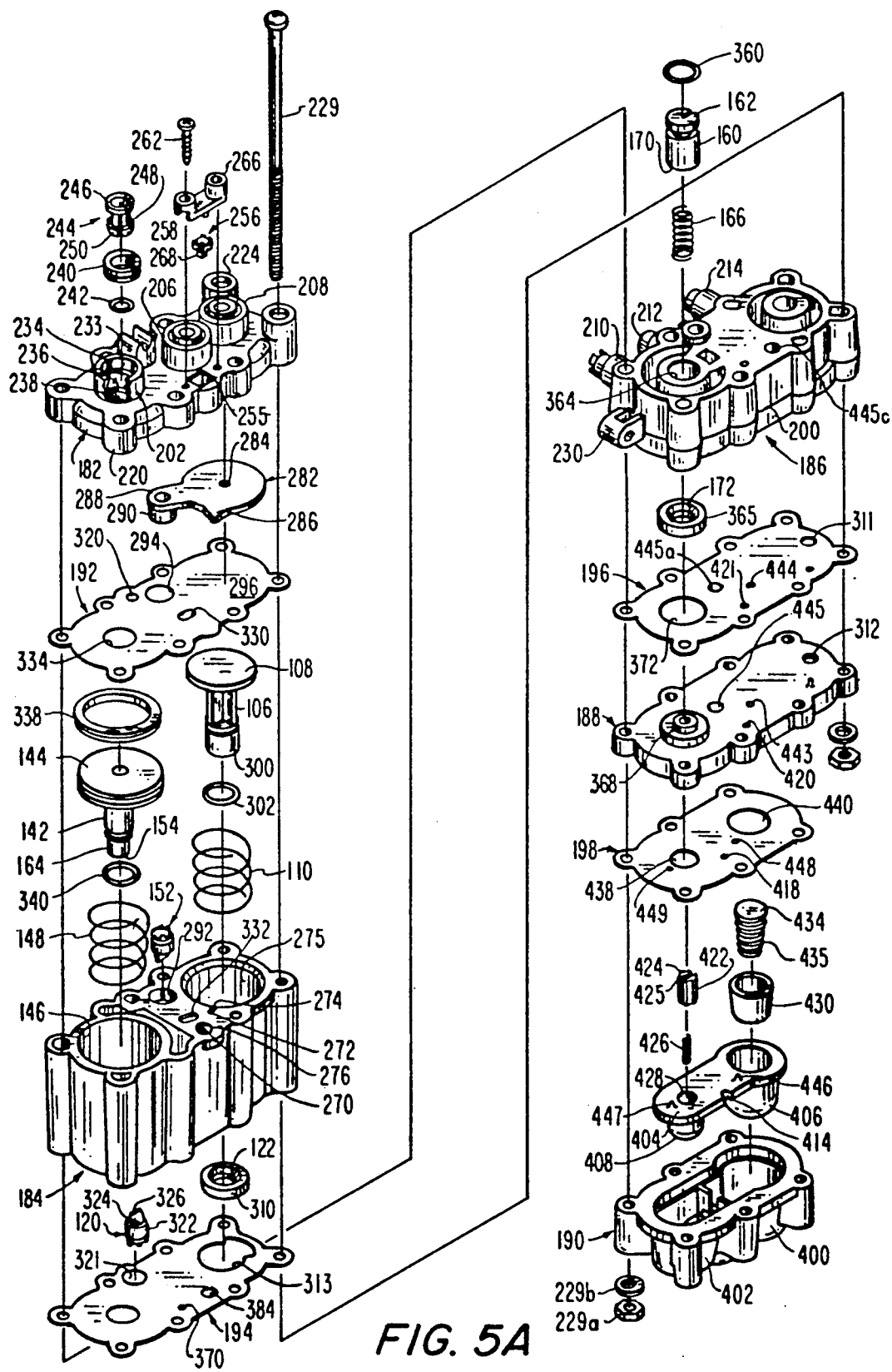
FIG. 5A is an exploded isometric view of a modular component shown in FIGS. 2 and 3.
Figure 5B:
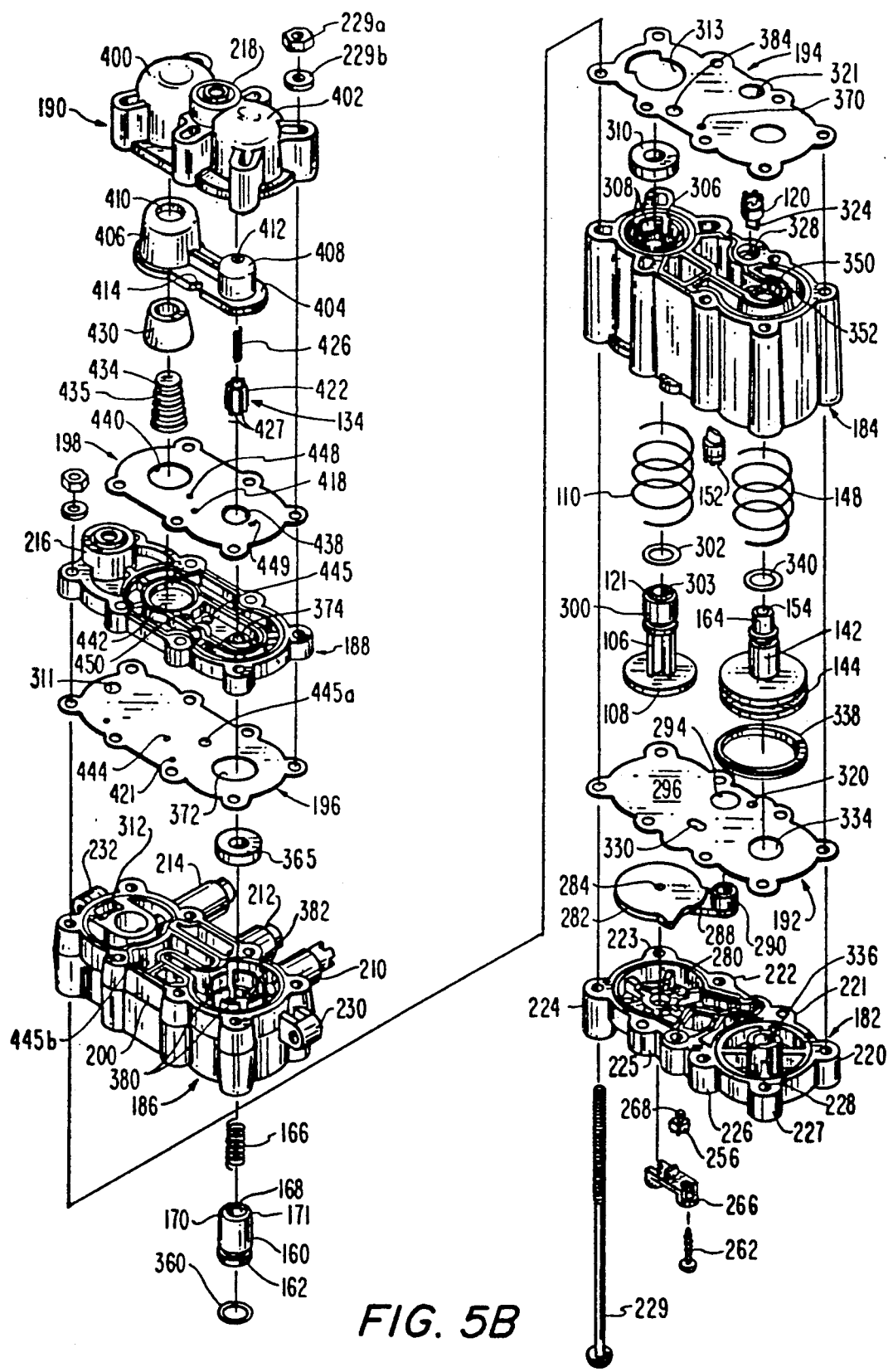
FIG. 5B is an exploded isometric view of the component of FIG. 5A but taken from a reverse perspective.

The different components of valve unit 24 preferably are combined into module 19 in this case constructed in the manner shown in FIGS. 5A and 5B. As will be seen, it provides the various mountings for those components and includes passageways and channels which serve as the various interconnecting conduits shown in FIG. 3. Projecting outwardly from different portions of the assembly are a plurality of individual couplings to which the various eternal conduits are connected as well as mounting structure.

Module 19 is composed of a stack of rigid molded segments 182, 184, 186, 188 and 190 individually separated by respective resilient rubber gaskets 192, 194, 196 and 198. O-ring type gaskets may be used. A line 200 which appears on segment 186 is a mold line; that segment does not come apart after its manufacture is completed.

On the outside of one end segment 182, a coupling 202 connects by way of flow monitor 92 to conduit 83 which leads to impurity filter 28. A coupling 206 connects to conduit 118 that communicates squeeze water from valve 126 to port 68 of storage tank 26. A coupling 208 in turn connects to permeate conduit 114 which leads to port 72 of the storage tank. Projecting outwardly from the side of segment 186 are couplings 210, 212 and 214 which connect respectively at membrane filter 22 to check valve 60 and therethrough to concentrate exit 58, permeate exit 56 and feed water entrance 54. At one side of segment 188 is a coupling 216 which is connected to conduit 102 and thereby leads to flow monitor 90 and therethrough to outlet coupling 44 of sediment filter 20. Finally, a coupling 218 projects outwardly from the other end segment 190 and serves to connect to and serves in part as drain conduit 128.

Successively spaced peripherally around end segment 182 are a plurality of nubs 220-227 through each of which is an opening as at 228. With the internal parts yet to be described positioned into appropriate place, a series of elongated bolts 229 (only one of which is shown) are inserted through those openings as well as through all of the correspondingly located openings in the similar nubs provided in each of the gaskets and all of the other segments except in the case of the bolts which project through openings 223 and 224 and continue only a short distance beyond the corresponding openings in segment 188. A plurality of nuts 229a disposed above corresponding washers 229b are threaded on each of the inserted ends of the respective bolts and are tightened for the purpose of clamping together the entirety of the assembly.

Projecting laterally outward from opposing ends of segments 186 are respective nubs 230 and 232 each of which has an opening therethrough for the purposes of receiving a screw that assists the mounting of module 19 within cabinet 10 (FIG. 1). Projecting outwardly from end segment 182 is a lug 233 bifurcated over its outer end portion as shown for the purpose of also assisting in the mounting of module 19 within cabinet 10.

Each of couplings 202, 206, 208, 216 and 218 is in the form of a hollow cylinder the interior wall of which is necked down in three successive steps 234, 236 and 238. A brass ring 240 is plugged into the outer opening to seat against step 234 beyond which is an O-ring 242 that seats against step 236. A generally cylindrical retainer 244 has a collar 246 from which laterally-inset fingers 248 depend longitudinally to respective laterally offset tips 250 inwardly from which projects a sharp-edged metal cleat (not shown). Retainer 244 is moved into place within ring 240 as tips 250 are forced therethrough. On installation, the connecting hose which serves as a conduit is inserted through collar 246 past the cleats and sealingly through O-ring 242 until its free end seats against step 238. Upon any attempt to pull out that hose end, the cleats dig into the exterior surface of the hose and resist such withdrawal.

Figure 3:
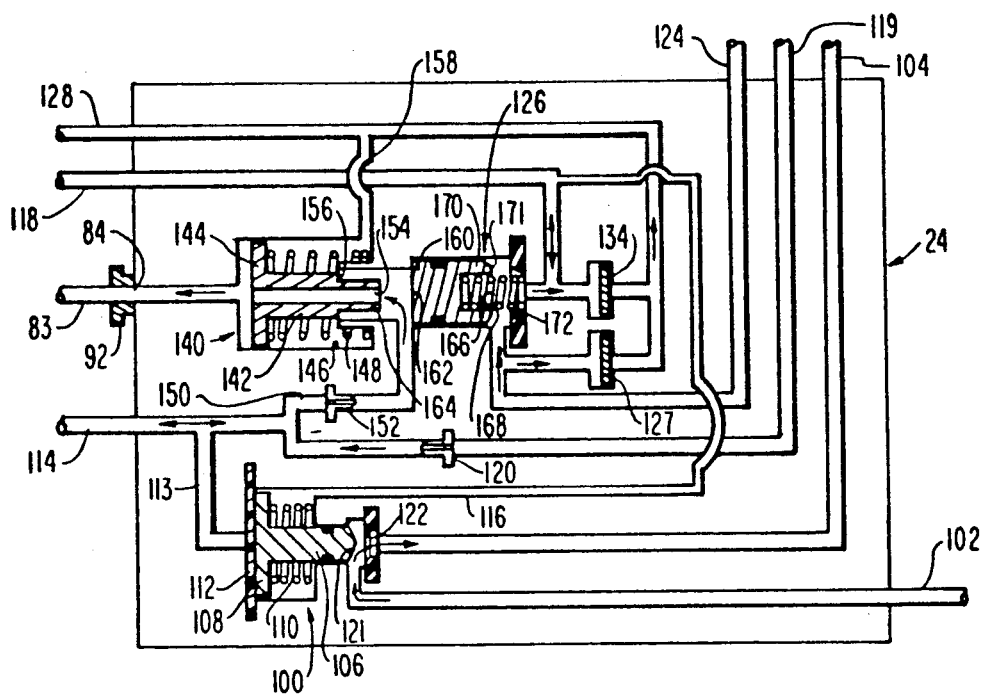
FIG. 3 is a further flow diagram of a valve unit shown generally in FIG. 2.

Formed into the outer surface of segment 182 as shown is a square well 255 which has an opening in its bottom and into which may be inserted a pressure-responsive microswitch 256 that has leads (not shown) which electrically connect to microprocessor 32. Screws 262 are inserted through corresponding openings in a cap 266 to secure cap 266 onto the top outer surface of end segment 182. Switch 256 has an actuating plunger 268 which, upon assembly, rests against a solid area of gasket 192 the other side of which area communicates with an opening 270 in segment 184. Opening 270 communicates internally of segment 184 to another opening 272 from which a small channel 274 in turn leads to what is an interior space or chamber 275 which is within inlet valve 100 and from which conduit 116 emerges (FIG. 3). It may be observed that opening 270 is surrounded by a recess 276 in order to permit pressure variation in opening 270 to cause a limited degree of flexure of that area of gasket 192.

As discussed above but not shown in FIGS. 2 or 3, switch 256 may be included for the purpose of enabling processor 32 to respond also to squeeze water pressure. However, it presently appears that the just-discussed provisions for switch 256 are unnecessary. The inclusion of switch 176 at the outlet side of impurity filter 28 adequately serves the purpose. Switch 176 preferably may include a pressure responsive piezoelectric transducer as may switch 256 if used. Preferably, a hydraulically-operated electromechanical switch is used for switch 176.

The immediately preceding discussion serves to illustrate how, when one compares a portion of the structure in FIGS. 5A and 5B to the flow diagrams of FIGS. 2 and 3, different fluid flow or pressure transmitting paths called for by the flow diagrams can with careful study be found within the different openings, cavities and related formations that are illustrated in FIGS. 5A and 5B with respect to the opposing sides of each segment and the shapes of the different gaskets. Thus, it becomes unnecessary to describe all of those paths in complete detail. The structure illustrated in the drawings is sufficient to enable the making and using of valve unit 24.

Aligned over coupling 208 is an irregularly-shaped well 280 into the interior side of segment 182. Seated into well 280 is an insert 282 with a small opening 284 through the center of its circular portion. A finger 286 presses gasket 192 over opening 272 and channel 274 in segment 184. A tab 288 has an upstanding hollow boss 290 which fits into a recessed opening 292 of segment 184 after passing through an opening 294 in gasket 192.

It may be observed that there is a large continuous area 296 of gasket 192 which overlies opening 284 in insert 282. In use, area 296 serves as diaphragm 112 described above with respect to FIG. 3. Atop diaphragm area 296 is the enlarged end 108 on one end of piston 106 surrounded by spring 110. Seated on the other end portion 300 of piston 106 is an O-ring 302. End portion 300 is axially recessed at 303 and the area surrounding the recess is tapered to define nose 121. Nose portion 300 is disposed within chamber 275 so that nose 121 projects through segment 184 and into a well 306 within which are a circumferentially-spaced series of longitudinal segments 308. Inserted within segments 308 is a washer 310 having a beveled entrance that serves as seat 122 for nose 121.

Except when nose 121 is pressed by diaphragm 112 so as to close against seat 122, water from sediment filter 20 is able to flow through coupling 216, a hole 311 in gasket 196, an opening 312 in segment 186 and a side of an opening 313 in gasket 194 after which it continues through the slots between segments 308 and finally emerges from the central opening in washer 310 in order to supply feed water through coupling 214 for delivery to membrane filter 22.

An opening 320 in gasket 192 provides a permeate path from incoming permeate coupling 212 by way of an opening 321 in gasket 194 and through check valve 120 to conduit 114 by way of outgoing permeate coupling 208. Valve 120 is in the form of a hollow cylinder 322 open at one end and closed at the other end by a snout 324 which is composed of a space-opposed pair of lips 326 that resiliently open for passage of water out of the lips but which close tightly against the flow of water in the opposite direction. Valve 120 seats in a wall 328 formed in segment 184. An opening 330 in gasket 192 communicates between squeeze water coupling 206 and an opening 332 in segment 184.

A larger opening 334 in gasket 192 surrounds an end-slotted hollow boss 336 which leads from permeate coupling 202. Cylinder 146 is defined within segment 184 and surrounds hollow piston 142 of regulator 140. As discussed earlier, piston 142 has enlarged end 144 and smaller end 154 that forms hollow boss 164, all together with compression spring 148. Enlarged end 144 seats an O-ring 338. Another O-ring 340 is seated on the central portion of piston 142 near smaller end 154.

At the interior end of cylinder 146 is a smaller bore 350 which receives boss 164. Bore 350 communicates through a well 352 to a bore 354 which serves as a stop for piston 160. Piston 160 carries an O-ring 360 near its closed end 162 and at its other end 170 is hollowed out to define well 168 and shaped to define a peripheral bevel which serves as nose 171. Piston 160 projects into and slides within a bore 364 in segment 186. Seated within well 168 and inserted through nose 171 is one end of spring 166. Spring 166 projects through a washer 365 formed like washer 310 to have one side of its central opening beveled so as to define seat 172. The other end of spring 166 seats on a hollow boss 368 on segment 188.

An opening 372 in gasket 196 communicates with the slots between a plurality of circularly-spaced segments 380 located in a well 382. As a result, there is a concentrate flow path from coupling 210 through the central opening in washer 365, opening 372 in gasket 196 and an opening 374 in segment 188. A concentrate path also extends from an opening 384 in gasket 194 through opening 332 in segment 184, opening 330 in gasket 192 and to squeeze water coupling 206. More detail is set forth hereinafter.

Other end segment 190 includes a large dome 400 near one end and a small dome 402 near its other end. The interiors of both domes 400 and 402 communicate with drain coupling 218. A closure strip 404 has corresponding smaller domes 406 and 408 that nest into domes 400 and 402. Domes 406 and 408 each have respective openings 410 and 412 which lead into the interiors of domes 400 and 402. A notch 414 in the edge of strip 404 also establishes communication to drain coupling 218 through a hole 418 in gasket 198, an opening 420 in segment 188, a hole 421 in gasket 196 and ultimately into cylinder 146 of regulator 140 so as to provide the drain connection of conduit 158 in FIG. 3.

Relief valve 134 includes a hollow cylinder 422 closed at end 424 in which there is a slot 425 and which is open at the other end to receive a compression spring 426. Cylinder 422 is generally circular but has a circumferentially-spaced series of ribs 427 on its exterior surface. Cylinder 422 with spring 426 contained therein is inserted into a bore 428 defined within dome 408. As indicated earlier, relief valve 134 ultimately is coupled between the drain and the concentrate path downstream from squeeze water valve 126 that serves to bleed pressure from tank 26 as the permeate flow fills bladder 66. Cylinder 422 is only a loose fit and never makes a complete seal.

Within cone 406 is a sleeve 430 in the form of a hollow truncated cone. Sleeve 430 is seated onto a solid generally-cylindrical body 434 on the exterior surface of which is a thread-like spiral channel that in use serves as a capillary tube 435. Sleeve 430 together with body 434 serve as proportioning valve 127. It will be recalled that it is valve 127 which establishes an eight-to-one concentrate-to-permeate ratio that remains fixed. Capillary tube 435 allows water to flow across the membrane for cleansing whenever permeate is being generated.

Cylinder 422 projects slightly outward from strip 404 through an opening 438 in gasket 198 so as generally to rest against the end of flow passage 374. A larger opening 440 in gasket 198 permits the larger end of body 434 to protrude into a well 442 on segment 188 and from the bottom of which an opening 443 begins a path through an opening 444 in gasket 196 and effectively back to concentrate conduit 124. This path is always open, bypassing piston 160 and seat 172.

An opening 445 through segment 188 communicates through a hole 445a in gasket 196 eventually with coupling 206. This passage receives concentrate from membrane filter 22 for delivery through opening 374. It further includes an opening 445b and an opening 445c in communication with opening 384. Mounting pins 446 and 447 on strip 204 project through corresponding openings 448 and 449 of gasket 198 with pin 446 seating into a hole 450 in segment 188.

Check valve 152 is constructed like valve 120 and seats in recess 292 in segment 184. Other holes and openings in the segments and gaskets and which are visible in the drawings will be observed to align with the different holes and openings that have been discussed in detail.

A specific physical embodiment of faucet or dispenser 30 is shown in FIGS. 6A–6F. A faucet 460 includes a lower housing 462 atop which sits an upper housing 464 from which emerges an operating lever 466. Projecting to one side of the normally vertical handle 472 formed by lower housing 462 is an opening 474 in which one end 476 of a preferably flexible hose 478 is disposed. The other end 479 of hose 478 is inserted into a channel 480 through a plug 481 disposed on top of a connecting tube 482 inserted within a bore 483 defined in handle 472.

Running centrally through plug 481 is a passage 484 within which slides a piston 486. The passage is sealed by an O-ring 488 assembled on a piston head portion 496. Disposed across the bottom of plug 481 is a washer 489 which forms a seat 490 against which a valve body 492 formed on piston 486 is urged upwardly by a compression spring 494 disposed between a shoulder 495 formed internally of tube 482 and a flat 493 on the bottom of valve body 492.

Projecting downwardly within opposing sidewalls 497 of lower housing 462 from upper housing 464 is a spaced pair of bifurcated ears 498. Lever 466 is positioned in a slot 500 formed centrally into the end of upper housing 464 opposite outlet 474. A pin 502 is disposed through lever 466 and is of sufficient length to rest within the bifurcated forks 504 of ears 498 as well as being captivated by the upper sidewalls of lower housing 462 upon assembly.

Figure 6A:
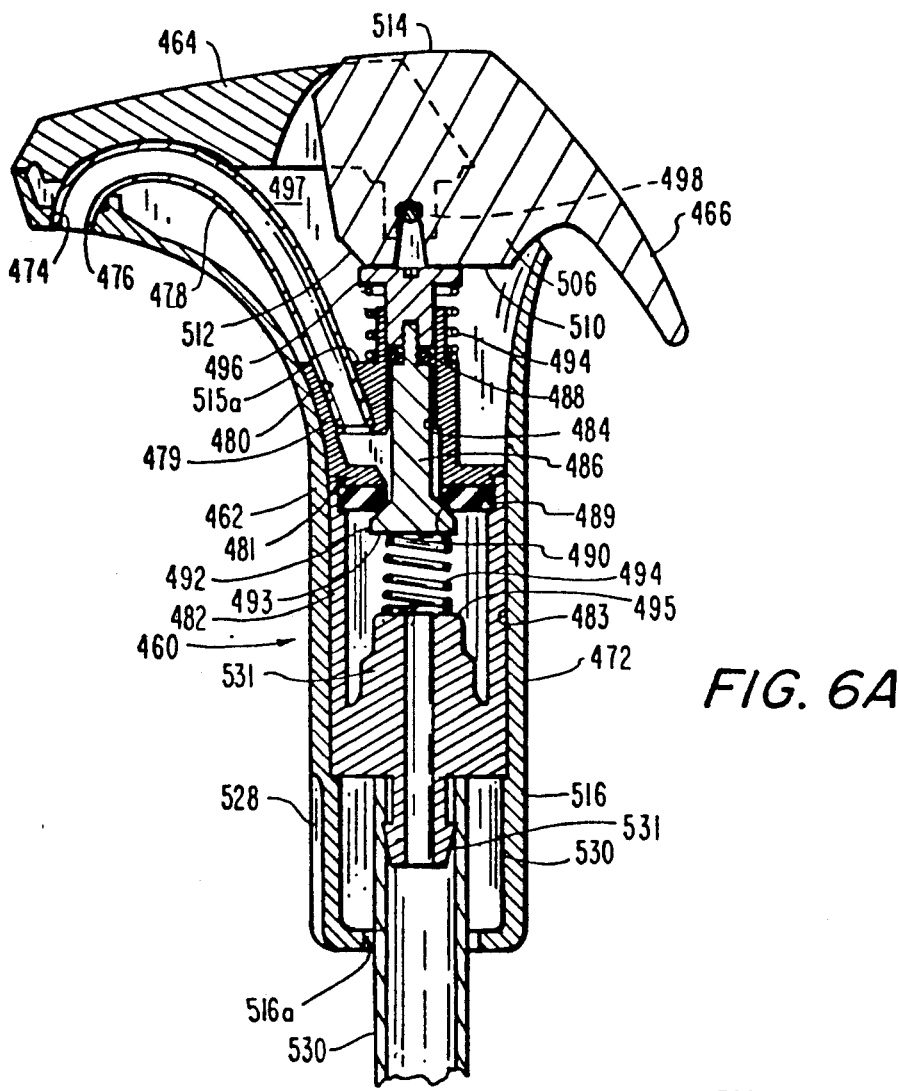
FIG. 6A is a longitudinal vertical cross-sectional view of a faucet employed with the filter assembly of FIG. 1.
Figure 6B:
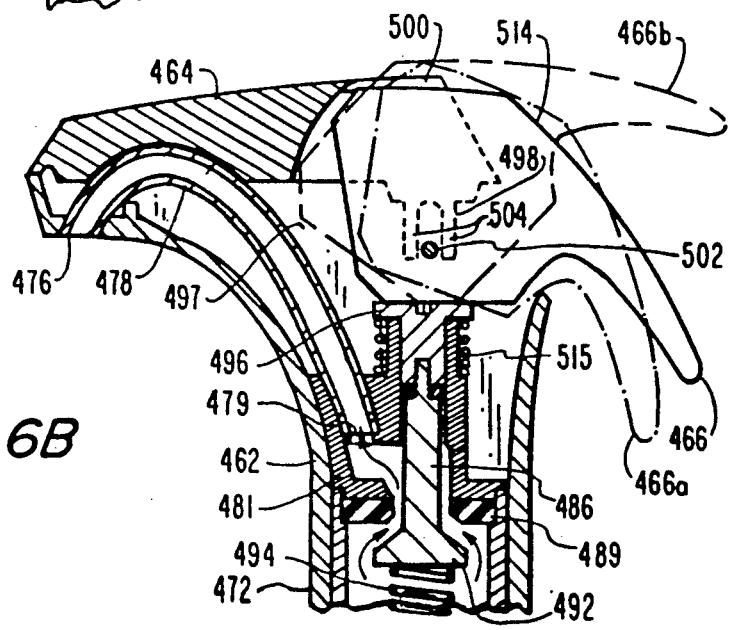
FIG. 6B is a fragmentary cross-sectional view similar to FIG. 6A but with certain parts in a different position and with one of those parts in still different position as indicated in phantom.

Lever 466 has an inwardly projecting cam 506 which engages piston head 496. Cam 506 has two successive facets 510 and 512. Swinging of lever 466 serves to select which facet is brought into contact with head 496, and that forces piston 486 to be depressed and open valve body 492 from seat 490. In addition, when upper normally level surface 514 above piston 484 is depressed by operation of the user's finger, head 496 is pushed downwardly to open valve 492 as shown in FIG. 6B. Alternately, lever 466 may be swung down to engage facet 510 and momentarily open the water flow path as shown in phantom for lever 466a. When the force is removed, valve body 492 closes against seat 490. Swinging lever 466 fully up as shown in phantom for lever 466b causes facet 512 to lock piston 486 in a position so that valve 492 remains open. When lever 466 is returned to the position in FIG. 6A, a spring 515 seated on a shoulder 515a biases piston head 496 toward facet 510 which, in turn, allows spring 494 to bias valve body 492 into a closed position.

When not being held in the hand, the lower end portion 516 of handle 472 is seated against a centrally apertured downwardly-concave crosswall 518 within the bore 520 of a base 522 as shown in FIG. 6E. An outwardly projecting longitudinal rib 524 is defined on the sidewall of the well 526 formed in the top of base 522 by crosswall 518. A longitudinal groove 528 on end portion 516 seats on rib 524 when handle 472 is placed into well 526, locking faucet 460 against turning.

A flexible hose 530 is connected onto a barb 531 formed on the bottom of connecting tube 482 so as to convey water toward valve 490, 492. Barb 531 is formed, as shown, to permit the end of hose 530 to be pushed on after which it cannot be pulled off with normal force applied. On emerging downwardly through an opening 516a in handle 472, hose 530 is connected to a hose 532 through a union 533 (not shown in FIG. 6e). The other end of flexible hose 532 is in this instance coupled as in FIG. 2 to receive the output of impurity filter 28 from the outlet of switch 176 at coupling 86. As an alternative, hose 530 could connect directly to the outlet of pressure switch 176. An aesthetically attractive collar 522a is mounted at the top of base 522.

As shown in FIGS. 6D and 6E, the lower end of base 522 is seated over the top of an air-gap unit 534 which has a platform 534a from which downwardly projects an externally threaded hollow tube 534b. Upstanding from platform 534a is a hollow boss 534c. Flexible hose 530 leads downwardly from faucet handle 472 through boss 534c, tube 534b, a gasket 535, a washer 536 and a nut 537 on into cabinet 10 wherein hose 532 becomes conduit 87 of FIG. 2 and connects through switch 176 to permeate exit 86. In a typical installation at a kitchen sink, tube 534b projects downwardly through the so-called third-faucet hole in the sink rim with that rim being sandwiched between gasket 535 and washer 536 by nut 537 threaded onto tube 534b.

Also upstanding on platform 534a is a baffle 538 which curves outwardly from its two ends to define together with an external portion of boss 534c part of a basin 539. The upper portion of a nipple 540 projects upward through platform 534a and opens into the bottom of basin 539. The lower end of nipple 540 connects to a flexible drain hose 132a which leads downwardly through nut 537 and serves as exhaust drain 132 of FIG. 2.

The upper portion of another nipple 541 projects upward through platform 534a and connects to the bottom of a rising flexible tube 542. A vertical divider wall 543 spans the distance from the side of boss 534c to baffle 538 and completes the definition of basin 539. The upper end portion of pipe 542 is assembled to a 90° barb 544 which is oriented reentrantly so that its bottom opening or outlet is spaced above the bottom of basin 539 and thereby forms air gap 130 of FIG. 2. Thus, the lower portion of nipple 541 connects to a flexible hose 128a that leads downwardly through nut 537 and in FIG. 2 becomes drain conduit 128. It may be observed that the bundle of hoses 19a as shown in FIG. 1 become the hoses discussed with respect to FIGS. 6A-6F together with another hose which leads to the raw water source (42 in FIG. 2).

FIG. 7 is a flow diagram of processor 32. While that flow diagram is herein basically implemented by the use of off-the-shelf individual components, it will be appreciated that all or most components except for a battery, a display and the input and output probes may be incorporated into a dedicated chip.

As shown, an input probe 550 is defined to include flow monitor 90 which serves as a flow meter and a temperature sensor. An output probe 552 is defined to include flow monitor 92 which also serves as a flow meter and a temperature sensor. Temperature is measured because, for example, water in storage tank 26 could be at 80° F. while incoming water in the winter could be 45–50° F. To determine the TDS from conductivity, temperature is herein normalized to 72° F. Not normalizing conductivity to a given temperature would cause extreme errors in measurement of TDS.

Respective input and output analog temperature signals are fed over respective leads 554 and 556 to an analog selector 557. In discussing this flow diagram, the terms "lead" or "connect" are used to describe what may be either a single or a multiple-wire connection. That is, the lines drawn represent signal paths.

A battery 558 supplies power for the entire system. Voltage reference 559 is connected to selector 557 by lead 560. A control ground system connects from a terminal 561 to all circuit devices except as separately shown or later described with respect to FIGS. 8A and 8B. Leads 562 and 553 connect one probe terminal in each of flow monitors 90 and 92 to respective terminals A and B of a probe selector 564.

A lead 565 connects probe selector 564 to one terminal of an AC to DC convertor 566. Leads 567 and 568 connect a second probe terminal in each of respective flow monitors 90 and 92 in common through a lead 570 to another terminal of convertor 566. By means of leads 571 and 572 the output of a one kHz AC simulation circuit 573 is also connected to the same terminals of converter 566 as are respective leads 567 and 568. Convertor 566 is connected by a lead 574 through a noise filter 575 connected in turn by a lead 576 to a DC level amplifier 578. Amplifier 578 is connected by a lead 579 to analog selector 557.

Probes 550 and 552 as selected at any given time yield a signal from flow monitors 90 or 92 which is in the form of a spike, and that spike is fed from filter 575 over a capacitor 580 to a spike detection circuit 582. The detected spike signal is then fed over a lead 584 to a pulse-shaping circuit 586 which transforms the spike into a more square pulse that is then fed by a lead 588 into a microcomputer 590.

The signal level from amplifier 578 represents a conductivity output signal which is fed to analog selector 557. The output chosen by analog selector 553 is fed over a lead 592 to an A-D convertor 596 for converting analog signals to representative digital count values that are fed to computer 590 by a lead 592 and leads 622–627 described further hereinafter. Analog selector 553 is controlled by signals fed from microcomputer 590 over leads 598 and 599. Another signal from microcomputer 590 is fed over a lead 600 to an audio circuit 602 for the purpose of developing an alerting sound. A further initiating signal from microcomputer 590 is fed over a lead 604 to AC simulation circuit 573.

Simulation circuit 573 feeds an alternating current signal to probes 550 and 552 so that they are actuated alternately. That AC signal also is fed to convertor 566 so as to cancel the same AC signal coming back from the probes. Consequently, the signal fed to noise filter 575 is composed only of the sensed direct current signal upon which the spike is superimposed.

To control the segments in a display 620, a continuously switching multiplex signal is fed to display 620 over respective leads 610–617. A-D convertor 596 is sequenced by the voltage on a plurality of leads 622–629 to cumulatively increase the compare voltage relative to the voltage from selector 557. That is, it is the difference between the selector output voltage and the compare voltage which is fed to microcomputer 590 over lead 592. When the compared voltages are equal, the voltage on lead 592 will toggle and the binary representation of the voltage will be read.

The negative terminal of battery 558 is connected by a lead 632 to microcomputer 590 and also to ground. A lead 633 connects the positive terminal of battery to microcomputer 590. A lead 634 returns alarm 602 to the negative battery terminal. A signal from microcomputer 590 by way of a lead 635 operates a ground switch 636. Switch 636 serves to disable most of the different components of processor 32, and thus most of the stages shown in FIG. 7, when the processor is on standby or hold. Upon receipt of a signal from pressure switch 176 at permeate outlet 86 (FIG. 2), ground switch 636 is actuated by the signal fed by a lead 635 from microcomputer 590. Thereupon, power is applied to almost all circuits or stages by grounding of control ground or terminal 561 and of analog selector 557 by way of a lead 637.

Figures 4A, 4B:
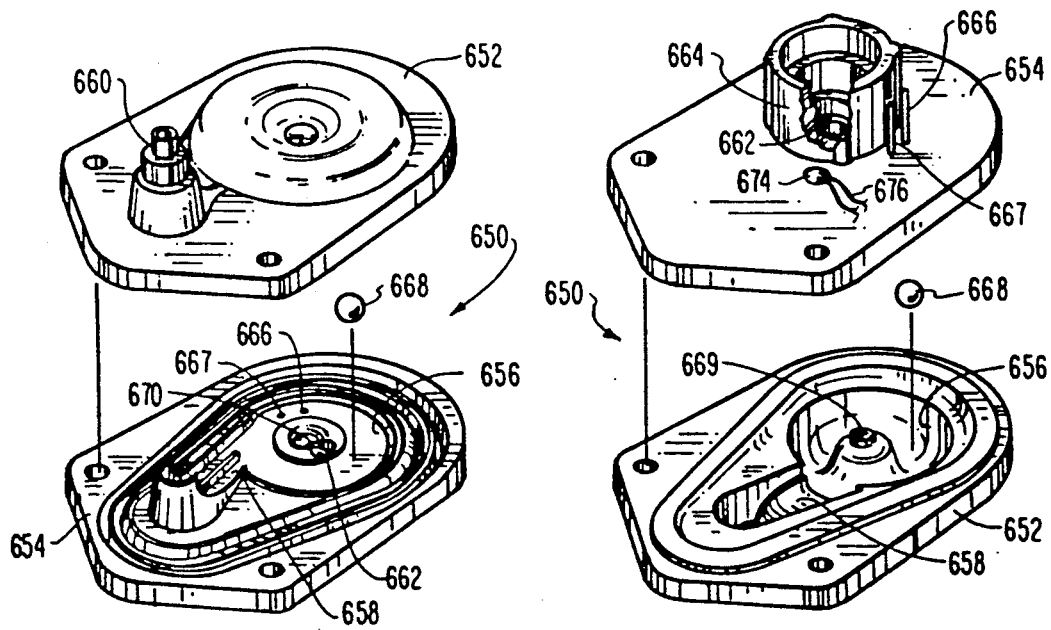
FIG. 4A is an exploded isometric view of a flow meter used in the system of preceding figures.
FIG. 4B is another isometric exploded view of the flow meter of FIG. 4A but taken from the reverse perspective.

Before delving into details of processor 32, attention will next be given to a preferred structural approach for input and output probes 550 and 552. As will be seen in FIGS. 4A and 4B, flow monitor 90 or 92 is first of all a flow meter and has a hollow housing 650 composed in this case of a top half 652 and a bottom half 654. The interior wall of the assembled housing is formed to define a circular raceway 656. An input channel 658 leads from a hose coupling 660 on the exterior of housing 650 and thereinto with channel 658 opening tangentially into raceway 656. An outlet channel 662 leads from raceway 656 to an outlet coupling 664 on the exterior of the opposite side of housing 650.

A pair of mutually-spaced electrically conductive probes 666–667 lead from the exterior of housing 650 insulatingly therethrough. In this case, bottom portion 654 and the top portion 652 are molded of a rigid plastic which is an insulating material. The ends of probes 666–667 project into the raceway just sufficiently to have physical contact with a ball 668 moving across the probe inner ends. Ball 668 is sized to move freely around raceway 656 when propelled by liquid flowing from inlet channel 658 to outlet channel 662. Ball 668 is of a material sufficiently abrasive to remove deposited matter from the inner ends of probes or electrodes 666–667. Moreover, ball 668 has an electrical characteristic which effects an electrical signal in moving thereacross. The electrical signal may be effected merely by the conductivity characteristics of ball 668. Preferably, ball 668 has a dielectric constant significantly higher than that of water so that its moving across the inner ends of probes 666–667 creates a spike-shaped change superimposed on the direct current conductivity level. This allows calculation in processor 32 of flow rate and total flow.

Outlet channel 662 might lead to any point around raceway 656, but its entrance 670 preferably lies generally along the axis of raceway 656 but as shown is slightly offset from that axis. A downward and axially projecting nub 669 on top portion 652 serves to direct water downwardly and into entrance 670. This ensures that ball 668 rides near the bottom of raceway 656 so as to move physically across the inner ends of probes 666–667. That effects a cleaning action of probes 666–667 in order to remove all build-up of materials which tend to deposit thereon from the liquid which in the present system is water that includes traces of sedimentary materials. Outlet coupling 664 is made the same as couplings 202, 206 and those others so as to grip and retain the inserted end portion of a hose.

Adjacent to probes 666–667 on the inner side of top portion 652 is a depression the bottom of which adjacent to raceway 656 is extremely thin so as to be at essentially the same temperature as that of the water flowing in the raceway. A thermistor 674 is seated in that depression for the purpose of developing a signal level representative of the temperature of the flowing liquid. Accordingly, thermistor 674 is connected electrically to processor 32 by a two-wire cable 676.

Figure 8A:
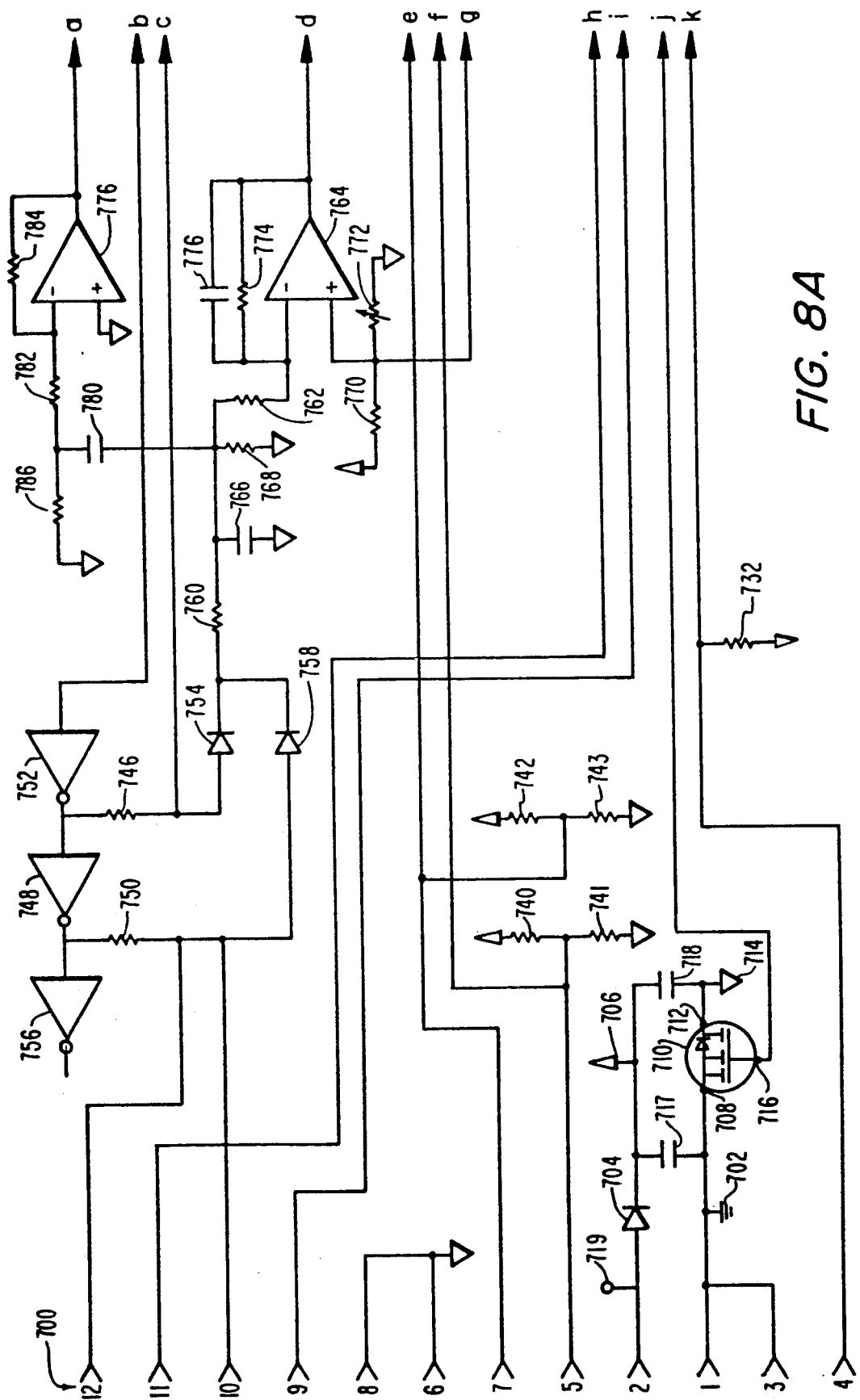
Figure 8B:
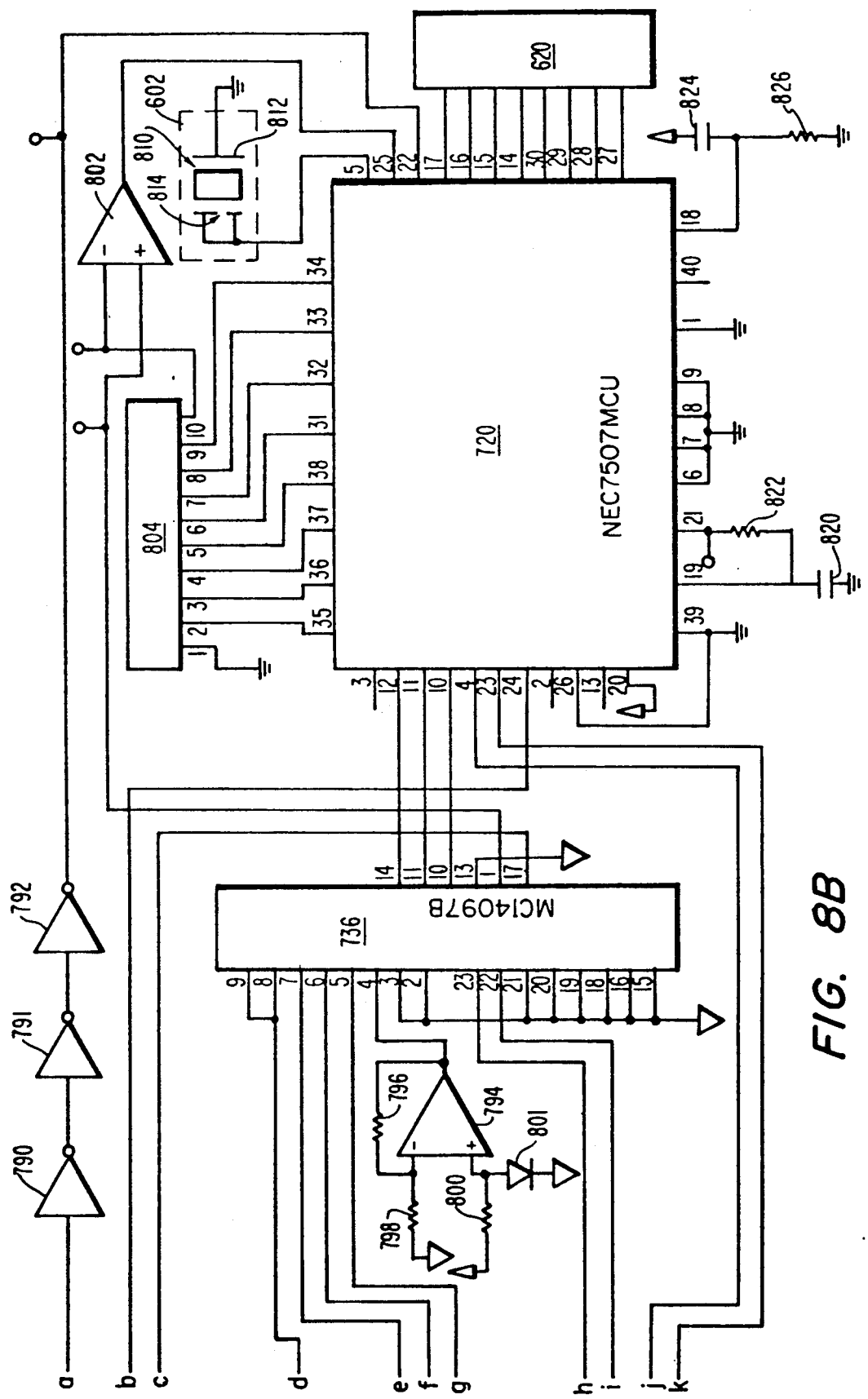
FIG. 8B is a continuation of the schematic diagram of FIG. 8.

Returning now to a more detailed discussion of the operation of processor 32, FIGS. 8A and 8B together represent a schematic diagram of a specific embodiment preferred for use in implementation of the flow diagram of FIG. 7. FIG. 8A continues onto FIG. 8B with the arrowheads at the right of FIG. 8A and denominated with the letters a-k indicating that each such lead continues on to the correspondingly lettered leads at the left side of FIG. 8B. At the left side of FIG. 8A there are a series of standard symbols that indicate female pin connections in a conventional multi-wire connector collectively indicated by the number 700. Each of the individual pins in that connector is assigned a corresponding pin number selected from 1 through 12. In contrast with the leads shown in FIG. 7 which indicated signal paths, all leads shown in FIGS. 8A and 8B represent a single conductor which may be either a line printed on a circuit board or an individual wire.

In connector 700, pin 1 connects to the negative of terminal battery 558, while pin 2 connects to the positive terminal of that battery. Pin 1 and pin 3 are connected to a common ground 702 represented by a conventional multi-bar arrowhead. Whenever that multi-bar ground symbol is used throughout FIGS. 8A and 8B, it means a connection directly to the negative terminal of battery 558. Pin 2, on the positive battery terminal, connects through a diode 704 to a positive supply terminal 706 represented by a narrow-based arrow. Whenever throughout FIGS. 8A and 8B a component has a connection represented by that narrow-based arrow, it means a connection to the positive battery terminal by way of diode 704. Protection against component injury from battery reversal is provided by diode 704.

Pin 1 of connector 700 is further fed to the source terminal of a Fetlington transistor 710 which has its drain terminal 712 connected to a control ground 714. That control ground 714 is represented by a wide-based arrowhead. Whenever throughout FIGS. 8A and 8B that wide-based arrowhead is depicted, that means a connection directly to control ground 714. The gate terminal 716 of transistor 710 is connected to a pin 4 of a microcomputer unit 720. In this case, microcomputer 720 is a type NEC7507MCU with the different pin numbers depicted around its borders corresponding to the pin numbers assigned to that unit by the manufacturer.

A capacitor 717 is connected between terminal 706 and common ground 702, while another capacitor 718 is connected between terminal 706 and control ground 714. Those capacitors serve to dampen any interference which may develop from external sources or even from internal sources such as the microcomputing unit. In conventional terminology, terminal 706 corresponds to the legend "VDD" often employed in connection with microprocessors and other integrated circuits.

Transistor 710 is the active device controlling power switch 636 of FIG. 7 by means of a control signal received from unit 720 so as to connect or disconnect control ground 714 from battery negative terminal ground 702. When transistor 710 is in its open state between its source and drain, all of the different circuit components returned to ground by way of control ground 714 are deactivated.

Pressure switch 176 is connected across pins 3 and 4 of connector 700 with pin 3 being connected to common ground 702. Pin 4 is connected at one end of a pull-up resistor 732 to keep a positive bias on pin 23 of unit 720 until the pressure switch is closed to short pins 3 and 4, thereby applying a negative or neutral bias to the processor.

A test point 719 is indicated between pin 2 and diode 704. Other such tests points are indicated in the same way at various places throughout FIGS. 8A and 8B and need not be mentioned further.

Pins 5 and 7 externally connect respectively to the thermistors in flow monitors 90 and 92. Pins 6 and 8 individually connect to respective opposite sides of each of those thermistors, returning those opposite sides to control ground.

Pins 5 and 7 internally connect respectively to pins 6 and 7 of an analog multiplexing and sampling device 736. In this instance, device 736 is a type MC14097B which has its different pin numbers indicated alongside. It will be observed that device 736 in part serves the function of analog selector 557 in FIG. 7. Pin 5 of connector 700 also is connected between resistors 740 and 741 in turn connected in series between positive terminal 706 and the control ground so as to serve a voltage divider. In the same way, pin 7 is also connected to such a voltage divider composed of resistors 742 and 743. The voltage dividers supply the necessary static operating current required for operation of the thermistors in flow monitors 90 and 92, along with allowing the correct current to be obtained through the thermistor.

Pin 9 of connector 700 externally leads to one probe electrode in flow monitor 92, while pin 10 externally leads to the other probe electrode in that monitor. Similarly, pin 11 externally leads to one probe electrode in flow monitor 90 and pin 12 externally leads to the other probe electrode in that monitor. Pins 9 and 11 of connector 700 are internally connected respectively to pins 22 and 23 of device 736. A probe select signal is conveyed from pin 1 of device 136 through a resistor 746, an inverter 748 and another resistor 750 to both of pins 10 and 12 on connector 700 that lead individually to an electrode in each of the flow monitors. A one kHz signal is fed from pin 24 of microcomputer unit 720 through an inverter 752, inverter 748 and resistor 750 also to pins 10 and 12 of connector 700.

The junction between inverters 748 and 752 is connected back through resistor 746 to a diode 754, and the junction between inverter 748 and still another inverter 756 is connected back through a diode 758 with the other sides of each of diodes 754 and 758 being connected in common through a resistor 760 and a resistor 762 to the minus input of an operational amplifier 764. A capacitor 766 is connected between control ground and a junction between resistors 760 and 762. A resistor 768 also is connected from the junction between resistors 760 and 762 to control ground. The other input of operational amplifier 764 is connected to a junction in a voltage divider composed of resistor 770 and potentiometer 772 with that junction also being connected to pin 5 of device 736. Potentiometer 772 is used for calibration of current and current return level. A feedback resistor 774 shunted by a capacitor 776 is connected between the output of operational amplifier 764 and its input connected to resistor 762.

Accordingly, the one kHz alternating current used to prolong the life of the electrodes in the flow monitors is obtained in the form of AC pulses from terminal 17 of device 736, those pulses being fed into a series of inverters with the output from the first inverter fed into the second and its output fed into a third. It should be noted that the output of the third inverter is not connected to anything. It is used to keep an even loading on the various circuits. The outputs of inverters 748 and 752 drive the probe electrodes through respective resistors. In essence, the one kHz frequency was chosen because of the time base needed in computer unit 720 and the resolution needed in order to determine flow rates up to three gallons per minute. Diodes 754 and 758 function as steering diodes to direct the composite signal toward operational amplifier 764 as well as to a pulse amplification circuit which includes another operational amplifier 776. Resistor 760 serves to lower the impedance on the output side of diodes 754 and 758 and assists in obtaining a higher signal-to-noise ratio. Moreover, resistor 760 together with capacitor 766 serve also to filter noise.

It will be observed that with respect to the flow diagram of FIG. 7 the function of simulation circuit 573 is provided by device 736 as is the function of probe selector 564. Diodes 754 and 758 together act as convertor 566 with the resistors and capacitors mentioned functioning as noise filter 575. Moreover, operational amplifier 764 serves the function of DC level amplifier 578 in FIG. 7 and its output is connected to pins 8 and 9 of analog device 736.

Operational amplifier 764 with its feedback resistor 774 averages out the spikes produced by the ball traveling between the electrodes in the monitor assemblies. The pulse of spike signal arriving through diodes 754 and 758 and resistor 760 is coupled over a capacitor 780 and through a resistor 782 to the minus input of amplifier of 776 the other input of which is returned to control ground. A feedback resistor 784 is connected from the output to the minus input of amplifier 776. It may be noted that amplifier 776 is operated in the inverting mode as is amplifier 764.

If found to be necessary, a capacitor may also shunt feedback resistor 794 in order better to filter out the one kHz signal along with noise that may be generated from external sources. To further enhance the amplification and lower the impedance, a resistor 786 is connected between control ground and the junction between capacitor 780 and resistor 782. Amplifier 776 is operated at a comparatively low gain so as to contribute to significant amplification only of the fast changing portion of the signal received from the probe electrodes. The output from amplifier 776 is fed through a series of inverters 790, 791 and 792 from which the pulse signal is fed to pin 22 of microcomputer unit 720. The combination of inverters serves to further shape the flow rate pulses for use by unit 720, corresponding the function of pulse shaper 586 in FIG. 7.

Voltage reference 559 of FIG. 7 is implemented as shown in FIG. 8B by inverting operational amplifier 794 having a feedback resistor 796 with its minus input being returned to control ground through a resistor 798. Its plus input is connected through a resistor 800 to the positive voltage source as well as through a reference diode 801 to control ground. The output of amplifier 794 connects to pin 4 of analog device 736.

The output from pin 17 of device 736 is fed to the plus input of a comparator 802 the output of which is fed to microcomputer 720 at its pin 25. The other input of comparator 802 is connected to an output pin 10 of an A-D convertor 804. Sampling input pins 2-9 of convertor 804 are individually connected respectively to pins 35–38 and 31–34 of microcomputer unit 720. Pin 1 of convertor 804 is returned to unswitched common ground. Thus, the function described earlier with respect to converter 596 in FIG. 7 is the same except that the comparison there mentioned is specifically shown in FIG. 8B as comparator 802. Convertor 804 will accumulate voltage until it reaches a sample voltage at which time the comparator changes states and stops microcomputer 720 from incrementing converter 804.

Display circuit 620 of FIG. 7 also appears in FIG. 8B and preferably is in the form of a twisted nematic liquid crystal display for providing visual information to the user. It's eight segments are connected individually to the different ones of pins 14–17 and 27–30 of microcomputer unit 720. The latter switches the backplane of the display and different segments at approximately twenty hertz. The segments are activated by inverting the signal to the backplane and the segments. The twenty hertz frequency was chosen for clarity of the segments as viewed through its polarizer.

Alarm 602 of FIG. 7 as shown in FIG. 8B includes a piezoelectric transducer 810 having one plate 812 connected to common ground and its opposite plates 814 connected to pin 5 of microcomputer 720.

Pin 19 of microcomputer 720 is connected over a capacitor 820 to common ground and also through a resistor 822 to pins 19 and 21. This governs the clock in unit 720 to generate a frequency of 200 kHz. Pin 18 of unit 720 is connected to the junction between a capacitor 824 and resistor 826 with the other end of resistor 826 being connected to common ground and the other side of capacitor 824 being connected to the positive DC supply. All of microcomputer pins 1, 6, 7, 8, 9, 26 and 39 are connected to common ground while pins 2, 3 and 40 remain unconnected.

The functions provided by the flow diagram of FIG. 7 and the specific circuitry of FIGS. 8A and 8B lend themselves to varied program features. One feature in the program is that of a self check. When the batteries are installed in the system, microcomputer unit 720 goes through a self-check routine which includes a display test wherein all display modes are sequenced, the audio alarm is sounded and the battery voltage is checked for being above a prescribed minimum.

After a new membrane filter has been installed, the system will display nothing after the foregoing self-check routine until about four gallons of water has been drawn from the system through faucet 30.

To protect the consumer against consuming the filtered water until all preservatives have been washed off the membrane, an "OK" segment on the display is not activated until that amount of gallonage has passed through the system. This function is automatically reactivated whenever the membrane filter is replaced.

There is a check of membrane status and conductivity measurement procedure. Input water conductivity and temperature are compared to output water conductivity and temperature. When the dissolved solids removal falls below about sixty-seven percent, display 620 indicates improper status. That comparason uses ten-sample averaging to assure that the reverse osmosis membrane is bad. When that is determined, accoustic alarm 602 is sounded and a "replace filter 2" is displayed. The alarm is reset when the removal rises above sixty-seven percent which is accomplished by replacing the membrane at which time the system goes back into the membrane flush mode discussed above.

There also is sediment filter status and flow rate measurement. The flow rate is measured by counting the revolutions of the ball in the flow monitor during a set period of time in order to calculate the flow rate. When that flow rate drops below about 0.25 gallons per minute, alarm 602 is sounded and a "replace filter 3" appears on display 620. When the flow rate rises above 0.25 gallons per minute, alarm 602 is reset. To prevent fluctuations in water pressure from giving false alarms, this determination also is averaged over a nine-sample period.

Another determination is made with respect to carbon filter status and total flow measurement. The total flow through the system is measured by incrementing a register each time the ball passes the probe electrodes in the flow monitors. When the flow reaches about five-hundred gallons, alarm 602 sounds and display 602 sequences between "replace filter 1" and "replace B". The latter is because when the carbon filter is replaced the battery is also replaced. Alarm 602 is reset by replacing the battery. As indicated, the battery should be changed each time the carbon filter is replaced. The battery (which may be multiple batteries connected together) is checked at the time of installation to be sure that enough energy is left to continue until the next carbon filter change. If the battery is above a preselected voltage with ground switch 636 activated, the battery has enough life left until that next filter change. This function is used to prevent the user from putting bad batteries in the system. If the batteries are weak at the time of installation, the unit will lock up the display on "replace B" and alarm 602 will sound.

There is a possibility that valve unit 24 will cycle at times when the faucet has not been turned on. The system described distinguishes between a normal cycle and a false cycle period. This is accomplished by checking output monitor 92 of the system for flow before continuing to process the signals provided by the valve unit.

As explained previously, microcomputer unit 720 disconnects the control ground and thereby shuts down most of the circuitry when it is waiting for water to be drawn from faucet 30. That conserves considerable power, lowering current drain from the battery to as little as about ten microamperes. Microcomputer unit 720 also controls all switch debounce, delays for retest and switch state monitoring. As noted, a one kHz signal is provided to the probe electrodes by analog selector and multiplexing device 736 under control of microcomputer 720. This prevents the plating of minerals out of the water onto the probe electrode ends. The nature of the material from which the flow monitor balls are made also contributes to keeping the probe electrodes clean.

During operation, the water flows around the outside of the inlet valve seat and then passes through a hole in the center of that seat to entrance 54 of reverse osmosis filter 22. When storage tank 26 is full of permeate, bladder 66 is expanded to the inner wall of the tank. When the permeate is continuing to fill, the pressure in the storage tank increases. Inlet valve 100 is sized so that when the storage tank reaches a desired shutdown pressure that pressure closes the inlet valve by means of the application of pressure upon diaphragm 112. After such shutdown, membrane output pressure is relieved through the proportioning valve. Check valve 120 holds pressure on conduit 114 to keep piston 106 closed. At this time, water through the remainder of the system is stopped until the consumer dispenses water from the faucet at which time the permeate tank pressure decreases enough to allow diaphragm 112 to permit the inlet valve to hold open.

It will be observed that the remainder of valve unit 24 is used to insure delivery of the water from the tank to the faucet at a constant delivery rate. With the squeeze water and regulator pistons open, the concentrate flows into the tank and squeezes the outside of the bladder to force the permeate water to the faucet. The regulator controls the flow to the faucet to enable action of valve unit 24 over a large range of pressure variation. Squeeze water valve opens or closes the flow to the squeeze side of the tank as actuated by the regulator. A stop within valve unit 24 prevents the squeeze water valve from retracting too far.

As the permeate flows from pressure tank 26 for delivery from the faucet, it enters the small side of the regulator piston and flows through the center of the piston. With increase of pressure on the larger diameter end of regulator 140, its piston begins to move. As it moves, however, the clearance between regulator 160 and the squeeze water valve piston decreases and that increases the pressure drop between the small and large diameters of the regulator. Consequently, the pressure on the large diameter of the piston decreases so that the piston retracts. During operation, the regulator piston operates at a point of equilibrium established by the pressures, the spring forces and the frictional forces.

When the faucet is open, the regulator piston is operating at a point of equilibrium and the squeeze water piston is fully retracted to allow the squeeze water to flow. When the faucet closes, the pressure in the outlet lines begins to increase. This increase in pressure moves the regulator piston so as eventually it pushes the squeeze water piston closed and thereby cuts off the flow of squeeze water. With the squeeze water valve closed, the relief valve bleeds the pressure from the tank so that permeate from the membrane can begin to fill the tank. As the pressure in the tank drops, check valve 152 prevents pressure on the regulator piston from dropping so that the squeeze water valve remains closed. Relief valve 134 eliminates back pressure on the reverse osmosis membrane and allows for optimal performance or rejection. Proportioning valve 127 provides flushing of the membrane to increase life.

The described reverse osmosis system proves to be highly desirable because it uses a membrane to remove solids and other contaminants that are dissolved in the water. Overall, the system measures performance and calculates updated status each time the system is used. Together with processor 32, flow monitors 90 and 92 indicate to the user the status of all of sediment filter 20, membrane filter 22 and impurity filter 28. That information is indicated both on a liquid crystal display in the cabinet and by an audio signal. The display is caused by processor 32 to sequence through the various components and display their current status whenever water is withdrawn from the system. Component status can be specifically displayed using a half moon, pie or bar type percentage graph in conjunction with the appropriate word for the component being indicated. Status may be indicated in other ways, such as merely signaling an "O.K.". When a component reaches a point that has been determined to be close to the lower functional limit of its proper operability, the audio signal is generated and this is followed by a display that continuously depicts a message that that component should be replaced.

Processor 32 monitors the conductance of the feedwater and compares it to the conductance of the permeate water leaving the system. Moreover, the current drop caused by the ball passing between the probes in each of the flow monitors is detected and used to determine flow rate and total flow each time the faucet is used. That flow rate is employed to determine the life of the sediment filter, and the total flow is employed to determine the life of the impurity filter. The self-cleaning probes have the built-in temperature compensation provided by the inclusion of thermistor 674.

The flow monitor system by itself may find use in a wide variety of different apparatus. Moreover, the operational capability of processor 32 together with the flow monitors may find equal applicability for use in either a sink-associated system as described or a much larger system such as those for purifying water supplied to an entire residence.

As embodied, the system was designed to generate permeate at a rate of approximately one-fourth gallon per hour. The arrangement including valve unit 24 enables the system constantly to be recharging whenever storage tank 26 is other than completely filled. Again for this specific sink-associated application, the impurity filter has specifically been designed to operate satisfactorily for five-hundred gallons. The indicator unit, as explained, signals when it should be replaced. The traditional beeper signal works to audibly alert the user when there is need for replacement of any of the filters or the battery.

It will be noted that the concentrate is permitted to flow through the proportioning valve and on to the drain as well as to flow to the squeeze side of the valve unit and travel to the storage tank where it is used as squeeze water. Permeate from the membrane filter flows directly to the permeate side of the storage tank inside the bladder. During delivery of the water, the concentrate squeezes the bladder and that forces the permeate to flow from the tank through the regulator and on through the final flow monitor. After flowing through the impurity filter, the water finally exits through the faucet.

As indicated, the function of the regulator is to allow for operation over a wide range of incoming line pressures and as a result to provide constant delivery of permeate to the faucet. When the faucet is opened, squeeze water from the membrane enters the storage tank at about the line pressure of the system. As squeeze water begins to collapse the bladder the permeate is in turn forced to flow to the faucet. Because the squeeze water flows to the tank at the same pressure, a constant delivery of water to the faucet is obtained regardless of how full of permeate the storage tank may be.

While the membrane is generating permeate to fill the storage tank, the concentrate flow is limited such that the pressure on the membrane is high enough for maximum removal of dissolved inorganic materials. In addition, the flow over the membrane is used to remove salts and is always sufficient to prevent build up of those salts on the membrane; therefore, membrane filter life does not deteriorate. As indicated, in the specific embodiment the flow rate of eight-to-one concentrate-to-permeate is maintained. The membrane is also cleansed when the water is delivered through the faucet.

The typical concentrate flow rates enabled by the described system are forty to three-hundred milliliters per minute, dependent upon incoming feed water pressure. In the manner described, the proportioning valve controls the concentrate flow and is always open and will let concentrate flow whenever the inlet valve is open so that water is flowing to the membrane filter. Another major function of the valve unit is to shut down the system when the permeate side of the storage tank is full. As implemented, it is the inlet valve which is designed to accomplish that system shut down.

While a particular embodiment of the invention has been shown and described, and various alternatives and modifications have been taught, it will be obvious to those of ordinary skill in the art that changes and modifications may be made without departing from the invention in its broader aspects. Therefore, the aim in the appended claims is to cover all such changes and modifications as fall within the true spirit and scope of that which is patentable.

We claim:

1. A flowmeter comprising:
   a hollow housing having an interior wall formation that defines a circular raceway;
   an inlet channel leading from the exterior of said housing thereinto and opening tangentially into said raceway;
   an outlet channel leading from said raceway to the exterior of said housing;
   a pair of mutually-spaced direct-current electrically conductive probes leading from the exterior of said housing insulatingly therethrough to exposure within said raceway;
   and a ball sized to move freely around said raceway when propelled by liquid flowing from said inlet channel to said outlet channel with said ball being of a material sufficiently abrasive to remove deposited matter from said electrodes and having an electrical characteristic which effects an electrical signal when moving thereacross.

2. A flowmeter as defined in claim 1 in which said liquid is water and said ball has a dielectric constant higher than that of said liquid as to effect a conductivity spike when moved thereacross.

3. A flowmeter as defined in claim 1 in which said outlet leads outwardly from said raceway in a direction axially thereof.

4. A flow meter defined in claim 1 which further includes a temperature sensor mounted on said housing and disposed closely adjacent to said raceway and responsive to the temperature of said liquid flowing in said raceway to develop an electrical signal representative of said temperature.

* * * * *

UNITED STATES PATENT OFFICE
CERTIFICATE OF CORRECTION

Patent No. 5,131,277    Dated July 21, 1992

Inventor(s) Thomas E. Birdsong, Steve O. Mork and Steven L. Peace

It is certified that error appears in the above-identified patent and that said Letters Patent is hereby corrected as shown below:

Column 4, line 46: "6f-6f" should read -- 6F-6F --.

Column 4, line 53: "8." should read -- 8A. --.

Column 7, line 15: "piston" should read -- valve --.

Column 8, line 32: "eternal" should read -- external --.

Column 13, line 6: "6e" should read -- 6E --.

Column 13, line 48: "become" should read -- becomes --.

Column 15, line 64: "inner" should read -- outer --.

Column 16, line 14: "are" should read -- is --.

Column 17, line 25: after "serve" should be inserted -- as --.

UNITED STATES PATENT AND TRADEMARK OFFICE
CERTIFICATE OF CORRECTION

PATENT NO. : 5,137,277

DATED : July 12, 1992

INVENTOR(S) : Thomas E. Birdsong, et al.

It is certified that error appears in the above-identified patent and that said Letters Patent is hereby corrected as shown below:

Column 21, line 13, after "valve" should be --126--.

Signed and Sealed this

Seventeenth Day of August, 1993

Attest:

BRUCE LEHMAN

Attesting Officer     Commissioner of Patents and Trademarks